Feb. 19, 1935.　　　F. L. FULLER　　　1,991,551
CASH REGISTER
Original Filed April 1, 1926　　5 Sheets-Sheet 1

Inventor
Frederick L. Fuller
By
His Attorney

Feb. 19, 1935.　　　　F. L. FULLER　　　　1,991,551
CASH REGISTER
Original Filed April 1, 1926　　5 Sheets-Sheet 2

Inventor
Frederick L. Fuller
By Carl Benst
His Attorney

Feb. 19, 1935.  F. L. FULLER  1,991,551
CASH REGISTER
Original Filed April 1, 1926  5 Sheets-Sheet 5

Inventor
Frederick L. Fuller
By
His Attorney

Patented Feb. 19, 1935

1,991,551

UNITED STATES PATENT OFFICE 1,991,551

CASH REGISTER

Frederick L. Fuller, West Orange, N. J., assignor to The National Cash Register Company, Dayton, Ohio, a corporation of Maryland Original application April 1, 1926, Serial No. 99,019. Divided and this application February 5, 1932, Serial No. 591,141

7 Claims. (Cl. 235—22)

This invention relates to cash registers or accounting machines and more particularly to that class of machines employing a plurality of totalizers.

The present case is a division of my application for Letters Patent, Serial No. 99,019, filed April 1, 1926, entitled "Cash registers", which issued as Patent No. 1,874,275 on August 30, 1932.

One object of the present invention is the provision of suitable mechanism to insure the proper control of the cash drawer in coordination with the other functions performed by the machine.

With this and incidental objects in view the invention consists in certain novel features of construction and combinations of parts, the essential elements of which are set forth in the appended claims, and a preferred form of embodiment of which is hereinafter described with reference to the drawings which accompany and form part of this specification.

General description

Figure 1:
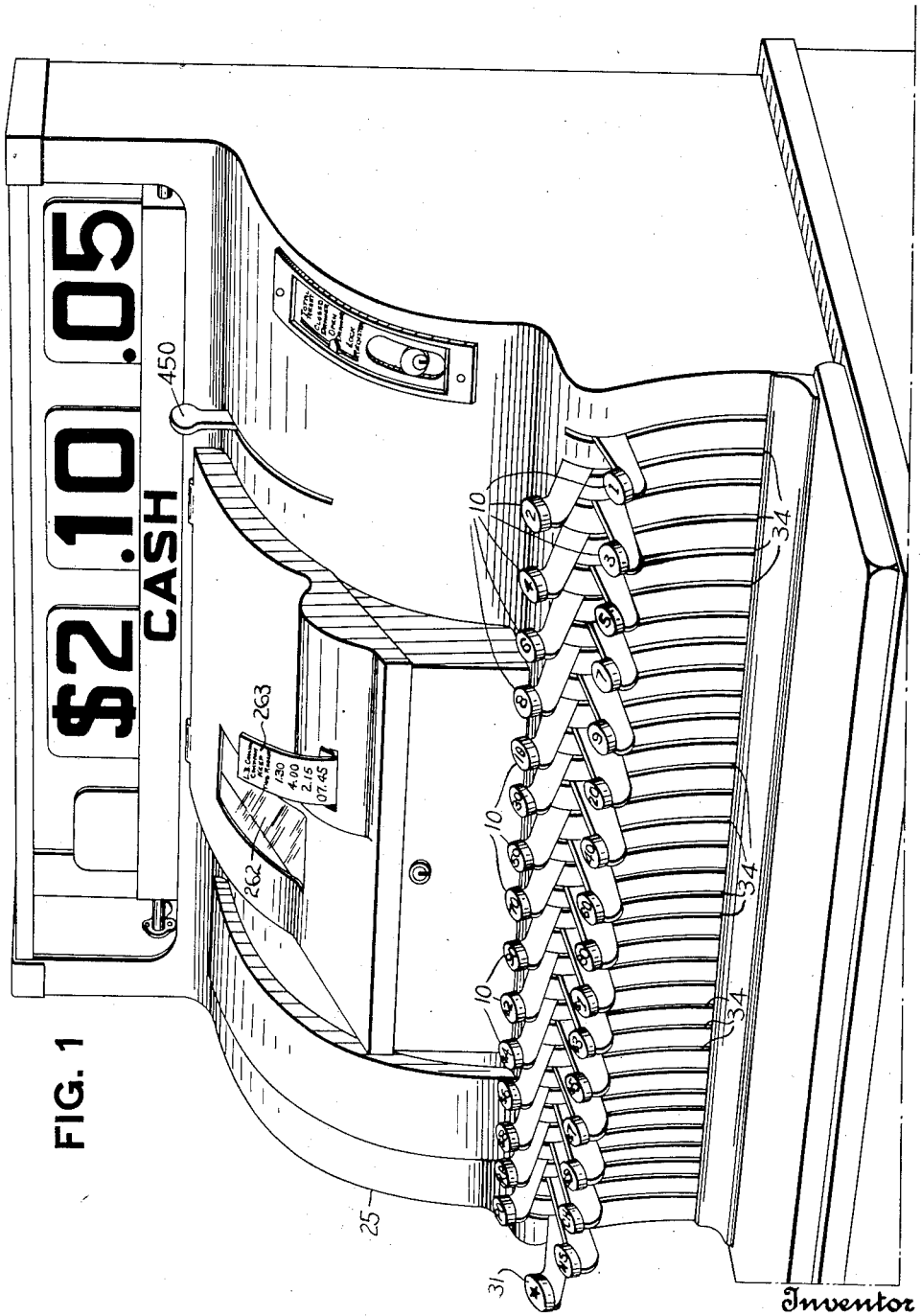
Fig. 1 is a view in perspective of the cash register to which this invention is applied showing the different banks of keys, the sub-total recording device, a part of the record strip and a sample of an itemized receipt which has just been issued.

Described in general terms the machine comprises a series of manipulative devices such as groups of keys which form the operating mechanism for entering items on an itemized receipt and in the totalizers.

Two totalizers are provided, one for accumulating the total of a series of items and known in the art as a "sub-totalizer", and the other for accumulating the total of all the items additively entered in the machine. This totalizer is designated as the "grand totalizer".

As the items are entered the type carriers will print the amount of each item upon the itemized receipt, the same being fed forward out of the machine an increment during each operation.

When it is desired to take a total a suitable manipulative device is actuated whereby the printer frame is rocked forward until the platen overlies the sub-totalizer accumulating elements where it is actuated to print the total upon the receipt. Restoring movement of the printer frame resets the accumulating elements to zero preparatory to accumulating a subsequent series of items. Operation of the manipulative device for taking a sub-total releases the cash drawer, rings a suitable alarm and actuates a lock for preventing operation of the keys while taking a sub-total.

At the end of a day's business or any other desired period the grand total of the items entered in the machine may be obtained by operating a special manipulative device. Manipulation of this will rock the printing frame forwardly, in a manner similar to taking a sub-total, until the platen overlies the grand totalizer. When in this position the platen is actuated thereby printing the grand total upon a suitable inserted slip.

The detailed description which is about to follow is divided under suitable headings reference to which will give a detailed description of the various features embodied in the present invention.

For the purpose of illustration this invention has been shown as applied to a type of machine the general principle of which is disclosed in the U. S. applications S. N. 263,125 filed November 19, 1918 and S. N. 283,720 filed March 20, 1919 by Frederick L. Fuller, and the British patents to Frederick L. Fuller No. 135,456; 140,363; 157,823; 157,824 and 157,825 for the same invention, but it is to be understood that this invention is not limited to this type of machine but may with equal facility be applied to other well known forms of accounting machines. The U. S. applications aforesaid have matured into Patents 1,742,701, January 7, 1930, and 1,729,338, September 24, 1929 respectively.

Supporting frames

The various parts of the mechanism are supported by a suitable framework comprising a base casting 21 (Fig. 2) and side frames 20 (Fig. 3) the latter being connected near their upper rear ends by a casting 24 (Figs. 2 and 3) utilized to support the tablet indicators and mechanism associated therewith. Further cross connections between the side frame 20 are in the form of a tie bar 23 (Fig. 2) across the lower front of the machine and a tie bar 22 across the lower rear part.

Near the center of the machine is a pair of supporting members 26 (Fig. 3) parallel to the side frames 20 and serving to support the totalizers and the type carriers for printing upon the itemized receipt and the record strip. The mechanism is enclosed by a cabinet 25 (Fig. 1) of any suitable form and made of any desired material.

Keyboard

The illustrative machine is provided with 32 keys (Fig. 1) there being three groups of amount keys; one group for entering amounts from 1¢ to 9¢, one group for amounts ranging from 10¢ to 90¢ and the remaining group for entering denominations from $1.00 to $9.00 inclusive. Four transaction keys are provided for denoting the type of transaction entered in the machine having associated therewith suitable indicators for showing to the bystander the nature of the transaction. The remaining key situated to the extreme left of the keyboard is known as a "coupler lifting key".

Key coupler

Figure 2:
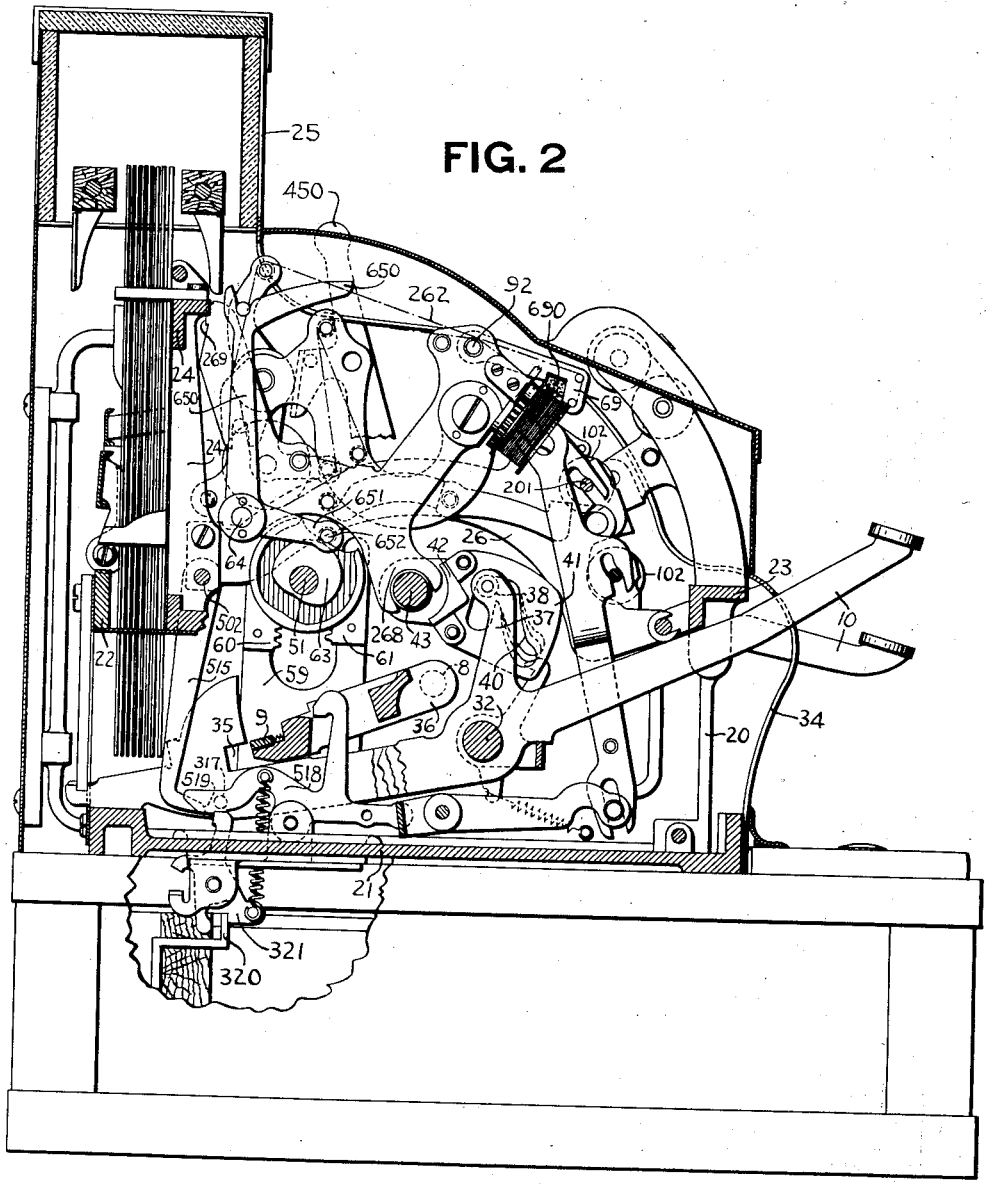
Fig. 2 is a transverse sectional view of the machine showing the item entering keys, the differential mechanism, the totalizer, the drawer release mechanism, and the movable printer frame adapted to record the total standing upon either totalizer.
Figure 5:
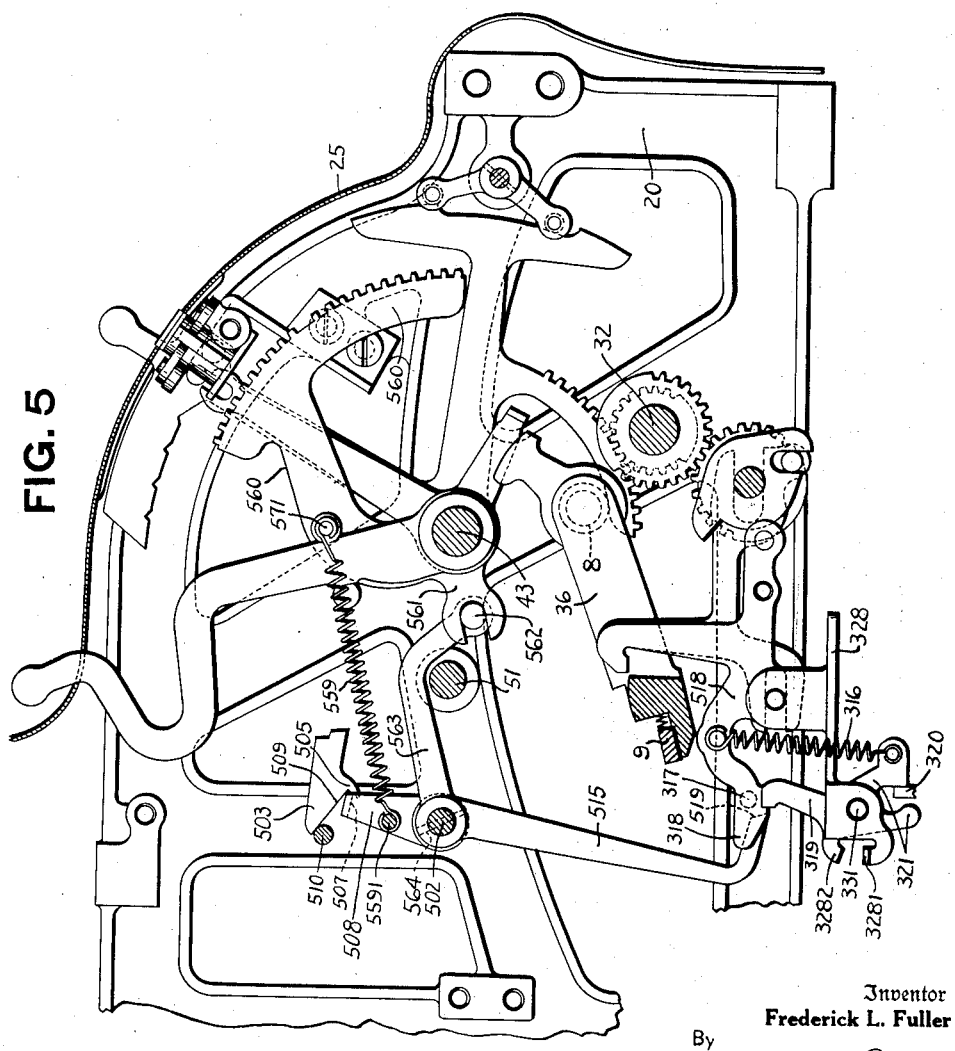
Fig. 5 is a transverse sectional view showing the drawer release mechanism and the resetting segment.

As is usual in a cash register of the type used for illustration, there is provided a key coupler 36 shown in Figs. 2 and 5, pivotally mounted on a shaft 8 journaled between the side frames 20. Mounted upon the nose of the key coupler 36 is a series of spring pressed latch plates 9, a latch plate being provided for each group of keys. Reference to Fig. 2 shows that the pivotal points of the key coupler 36 and keys are displaced with respect to each other so that a circular arc described by the rear edge of the key coupler 36 will intersect an arc described with the key shaft as a center and passing thru the same point. Advantage is taken of these intersecting arcs for the purpose of latching or coupling the keys so the depression of any particular key will result in a depression of all the other keys that have been attached to the coupler. This mechanism is old and well known in the art and need not be described in detail.

Connected to the key coupler 36 (Fig. 2) is a plate 59 provided with rack teeth 60 and 61. Fast to a shaft 51 journalled between the side frames is a pinion (not shown) meshing alternately with the rack teeth 60, 61. The result of this is that when the coupler is rocked by the keys, the rack teeth of the plate alternately engage the teeth of the pinion fast to the shaft 51 and by this means a complete reciprocation of the coupler effects a complete rotation of the shaft. The mechanism for effecting rotation of the shaft is also old and is not described in detail.

Transaction keys and coupler lifting key

These mechanisms are fully described in the aforesaid parent application, and since they are not directly involved in the invention covered by this case, they will not be described.

Amount keys

The amount keys 10 which extend nearly across the front of the machine as clearly shown in Fig. 1, are loosely pivoted upon the key shaft 32 so that they may be moved through an angle about said shaft as a pivot. Referring to Fig. 2, it is seen that each of the amount keys 10 is guided in its movement by slots 34 formed in the cabinet and lies immediately below the key coupler 36. Each amount key is provided with a notch such as 35 engageable by the nose of the key coupler 36 when the keys are depressed, so that they may be latched to the key coupler.

When the key coupler 36 has been elevated a predetermined distance upon the depression of the coupler lifting key 31, the nose of the key coupler is elevated so that said nose is slightly above the notch of all undepressed keys. Mounted on the nose of the key coupler are suitable spring-pressed latch plates, as have been described heretofore, which spring rearwardly so as to permit said latch plate to slide into the notch 35 when an amount key has been partially depressed, so that a further movement of the key coupler by any engaged key will result in a complete depression of all partially depressed keys.

Each of the numeral keys is provided with an upwardly extending arm 37 carrying at its extreme upward end a suitable anti-friction roller 38 which cooperates with slots 40 formed in a cam plate 41 as will be more fully described hereinafter.

Differential mechanism

The differential mechanisms or devices controlled by each of the various banks of amount keys and transaction keys are all similar in construction and principle and the description of one will suffice for all.

Loosely mounted upon a shaft 43 journalled between the side frame 20 is a frame 42 (Fig. 2) provided with spaced slots in which are inserted and secured by any desirable means a series of cam plates 41 one for each key of a particular group. The cam plates 41 are provided with L shaped slots 40, having portions concentric with respect to shaft 43 and other portions extending away from the shaft, and graduated as clearly shown in Fig. 2. The anti-friction rollers 38 cooperate with the respective cam slots and from the foregoing it will be evident that upon a depression of an amount key a differential movement will be imparted to the frame 42. When the frame 42 is actuated differentially the rollers 38 of the undepressed amount keys remaining in the respective bank will play in the concentric portions of slots 40 provided to permit the upward tilting of the cam plates 41 without interfering with the rollers of the unoperated keys.

It is to be understood that there is a differential frame 42 for each group of amount keys and one for the transaction group of keys as well.

Each differential frame 42 has secured or connected to it, so as to be movable therewith, a segmental rack 49 (Fig. 3) and since there are four differential frames there is a similar number of segmental racks.

Referring to this figure it will be seen that the totalizer actuating racks 49 are spaced closely together, whereas, reference to Fig. 1 shows that the numeral keys are spaced across substantially the entire front of the machine. It is therefore necessary to provide suitable transposing mechanism for transmitting the motion from any of the differentially actuated frames to the closely spaced actuating racks shown in Fig. 3, and to this end any suitable bail mechanism for transferring this movement may be conveniently utilized for this purpose.

Item printing wheels

Figure 3:
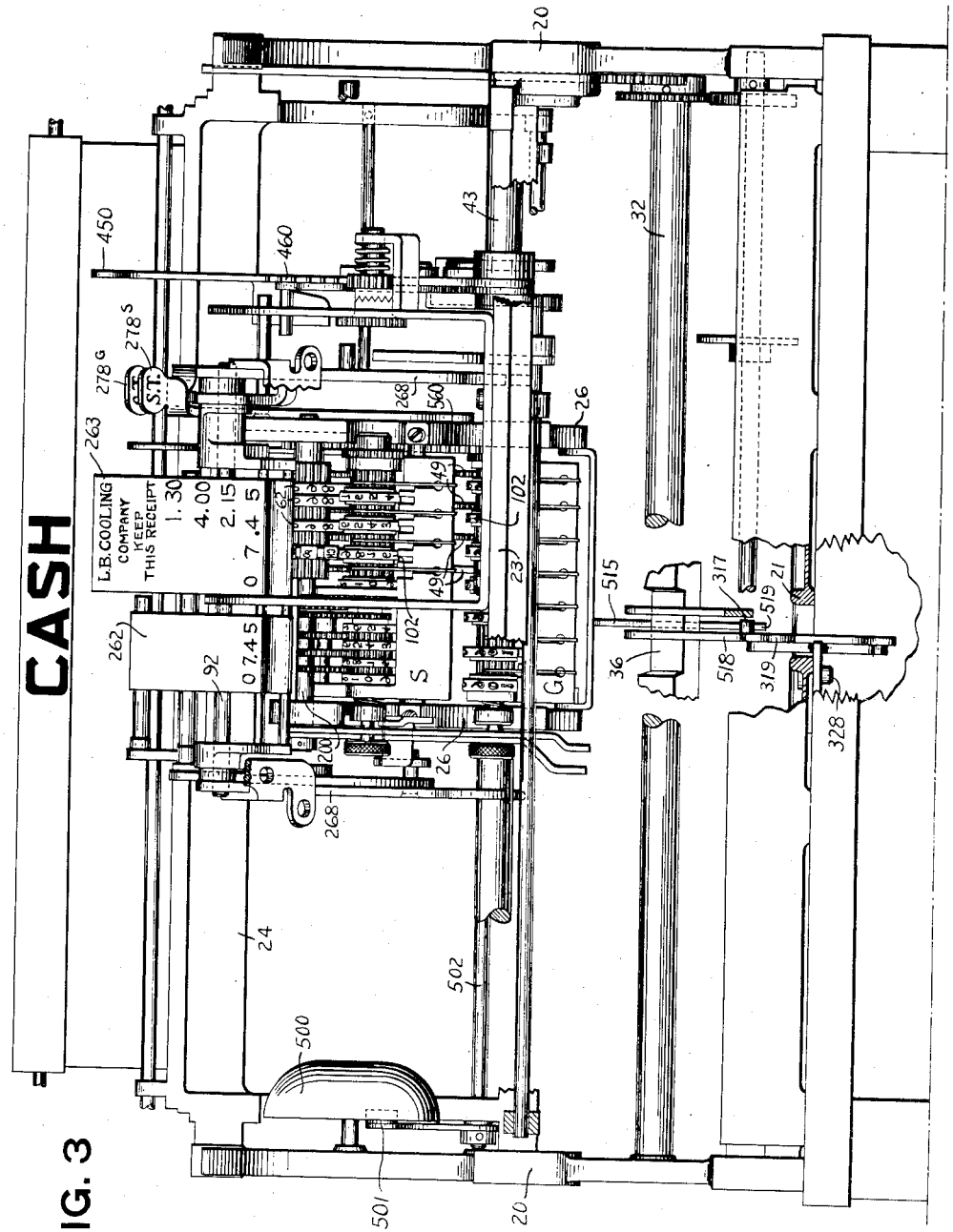
Fig. 3 is a view in front elevation of the machine, the cabinet being removed to show more clearly the parts. This figure shows the two totalizers, the operating means for recording the totals of either accumulator, and itemized receipt and part of the printed record strip.

A suitable set of printing wheels is provided for the purpose of positioning type for printing the amount and character of the transactions upon the itemized receipt. Referring to Fig. 3 there will be seen a plurality of type wheels 62. Rigidly attached to each of the type wheels 62 is a pinion meshing with the associated actuating rack 49. All the item and transaction printing type wheels are loosely mounted upon a shaft 200 suitably journalled between the intermediate supporting frames 26. Thus it is evident that when the keys 10 are depressed and their corresponding racks 49 thereby given a differential degree of movement the printing wheels 62 will be rotated, correspondingly, so that when suitable impression means are actuated, said wheels 62 will print characters indicating the amount and nature of the transaction.

Totalizers

In the machine disclosed in the accompanying drawings there are shown two totalizers designated generally by the letters S and G, (Fig. 3) the accumulating elements of which are driven by the actuators 49. Referring particularly to Figs. 2 and 3, the totalizer S is designed to accumulate the total of quantities to be printed on an issued itemized check. This totalizer may be termed a "sub-totalizer". The totalizer G is designed to accumulate a grand total of all items additively entered into the machine.

These totalizers are pivotally mounted between the side frames 26 just below the item type carriers 62 and comprise a plurality of totalizer elements 102 the peripheries of which are provided with suitable printing type so that the totals accumulated thereon may be printed upon an issued receipt or check from the S totalizer and upon an inserted slip of paper from the G totalizer in a manner to be more fully described hereinafter.

The totalizer elements are operable by the segmental racks 49 which set up the item type carriers and it is to be noted at this point that although the segmental rack corresponding to the transaction group of keys sets an item type carrier 62 it does not actuate the totalizer elements, the rack teeth being cut away to prevent this as shown and described in the aforesaid parent application. The detailed construction of these totalizers, together with the means for selectively engaging them is also contained in the said parent application.

Record strip printing wheels

It is desirable that each time a sub-total of the items entered in the machine is printed upon the itemized receipt, the same amount be also printed upon a record strip. The record strip provides a complete record of all the transactions entered in the machine and at the end of a particular period may be detached from the machine and stored away for future reference. This mechanism is generally shown in Fig. 3, but since it is fully shown and described in the parent application and is not directly involved here, it will not be described.

Printing mechanism

The printing mechanism employed in the present machine and shown in the drawings is similar in principle and construction to that shown and described in the British patents to Fuller previously mentioned, the construction being modified to a minor extent to be adaptable for the present invention.

The entire printing mechanism is supported by plates 268 (Fig. 3) the lower ends of which are provided with claws (Fig. 2) overlying the shaft 43. Normally the printing mechanism rests rearward in the position shown in Fig. 2 with lugs 269 contacting with a portion of the frame 24. The frame is normally in a position to print the items entered in the machine upon the itemized receipt, but may be rocked downwardly to print from either the sub-totalizer or grand totalizer as will be more fully referred to hereinafter.

Journalled in the printer side plates 268 is a shaft 64 the extreme left end of which has fast to it a bell crank 650 clearly shown in Fig. 2. The horizontal arm 651 of the bell crank carries a roller 652 which co-acts with a box cam 63 fast to the shaft 51. As has been mentioned heretofore the shaft 51 is given a complete rotation during each operation of the machine and rotation of the cam 63 will thereby rock arm 651 to actuate a platen and feed the record strip 262 as will be presently described.

Extending transversely of the printer side plates 268 and journalled therein, is a platen shaft 92 having secured thereon the forwardly extending platen arms 68. A platen connects the forward ends of these arms, and carries a rubber impression block 690.

When the bell crank 650 is rocked clockwise by rotation of shaft 51 during an item entering operation, the impression block 690 will be forced downwardly against the item wheels 62 (Fig. 3) to take therefrom an impression on a receipt strip 263. A detailed description of the printing operation, as well as the accompanying paper feed therefor, will be found in the aforesaid parent application.

Printing from the sub-totalizer

After the series of items which constitute a particular transaction has been entered in the sub-totalizer and the various amounts printed upon the itemized receipt the total accumulated by the sub-totalizer "S" is also printed upon the receipt.

A manipulative device is provided for accomplishing this. Printing of the sub-total by manipulation of this device will also accomplish certain other work, such as sounding a suitable alarm and releasing the cash drawer so that the money received may be deposited.

In order to take a sub-total it is necessary to rock the printing mechanism forward so that the impression block 690 overlies the sub-totalizer printing elements, actuate the same, and then rock the printing frame again to its rearward or normal position.

This printing operation is performed by the operator grasping a lever 450 (Figs. 1, 2, 3 and 4), pivoted on the rod 43, and drawing it forward. This rocks the printer frame forward and causes printing from the sub-totalizer and an issuance of the itemized receipt. This is effected through the provision of a flange 452 (Fig. 4), on the lever 450, lying behind a stud 453 secured to the side of the sub-total lever 278S to cause this lever to move counter-clockwise whenever the lever 450 is drawn forward. The issuance of the receipt is caused by operation of suitable feeding rolls rotated by the segment 460 integral with the lever 450. A detailed description of this operation appears in the parent application. The lever 450, on its return stroke, also causes an alarm to be sounded and the cash drawer to be released. The mechanism involved in obtaining these latter functions will now be described.

*Means for sounding an alarm when issuing an itemized receipt*

It is desirable in machines of this class to sound an alarm, such as a bell or an equivalent, when the operator is obtaining a sub-total of the items entered in the machine.

Figure 4:
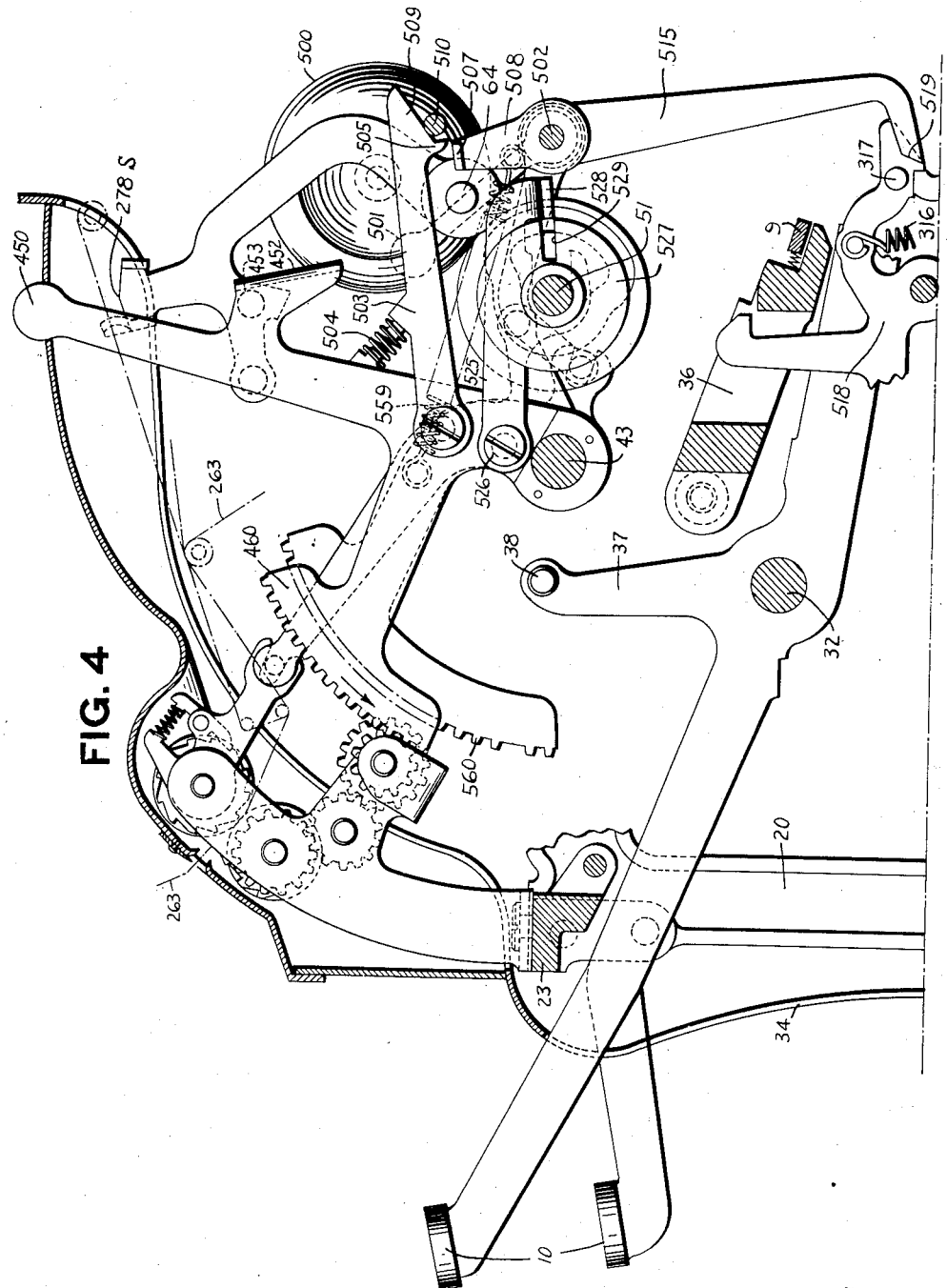
Fig. 4 is a transverse sectional view of the machine showing the resetting segment, the manipulative means for printing from the sub-totalizer, the driving mechanism for the itemized receipt feed roller, the mechanism for sounding an alarm, and the interlock between the total recording means and item entering mechanism.

The bell 500 (Fig. 4) is secured by any desirable means to one of the side frames 20 and is adapted to be struck at the proper time by a bell hammer 501 which is secured to a rock shaft 502 journalled between the side frames 26. Also secured to the rock shaft 502 is a rock arm 508 provided with a bent over lug 507 which is in the plane of a trip arm 503 pivoted to the sub-total manipulative device 450. Supported by ribs integral with the rear supporting frame is a rod 510 (Figs. 4 and 5). A spring 504 (Fig. 4) interposed between the sub-total manipulative device 450 and the trip arm 503 urges the trip arm 503 downwardly so that a cam edge 509 formed at the extreme end of the trip arm 503 contacts at all times with the rod 510. The arm 503 is also provided with a trip lug 505.

Also secured to the rock shaft 502 is a forwardly extending arm 563 (Fig. 5) having a stud 562 on its forward end lying in a slot in an arm 561 of a segment 560. A spring 559 is connected to this segment and to a stationary stud 5591.

The result of the above construction is that whenever the sub-total lever 450 is drawn forward, the spring 504 urges the trip lug 505 downwardly upon the lug 507, the lug 505 dropping in front of the lug 507 during the forward movement. When the lever 450 is moved rearwardly the lug 505 forces the rock arm 508 and the bell hammer 501 rearwardly, and through the parts 502, 563, 562, and 561, causes the segment 560 to rotate clockwise (Fig. 5) about rod 43 to tension spring 559. During this rearward movement (Fig. 4) of the arm 503 the cam edge 509 slides on the rod 510, raising the lug 505 until it allows the lug 507 to escape therefrom and return to normal position, under the influence of spring 559. The bell hammer 501 of course returns therewith and rings the bell 500.

*Drawer releasing mechanism*

The drawer releasing mechanism is operated so that the drawer is released at each operation of the lever 450. This mechanism is best shown in Figs. 2, 3 and 5.

Pivoted to the base of the machine is a drawer catch release lever 518 provided with a pin 317 and a hook 318. The lever 518 is adapted to hook over a drawer catch 319 which is pivoted at 331 to a frame piece 328 attached to the base of the machine and is provided with a double hook 321 which cooperates with a bracket 320 carried by the cash drawer which is normally urged outwardly by a spring (not shown). A spring 316 connects the drawer release lever 518 and the drawer catch 319.

Secured to the rock shaft 502 by a pin 564 is a trip arm 515 provided with a forward extension having a cam edge 519 adapted to engage the pin 317 and lift the drawer catch release lever 518 at the appropriate time.

The result of the above construction is that whenever the shaft 502 is rocked by the rearward movement of the arm 503 the cam edge 519 of the arm 515 will engage the pin 317 thereby releasing the hook 318 from the drawer catch 319 permitting the drawer to fly open. A bent over lug 3281 on an extension of the frame piece 328 projects into the plane of an extension 3282 of the drawer catch 319 and serves to limit its rocking movement.

*Resetting the sub-totalizer*

Resetting the sub-totalizer wheels is accomplished by rotating the totalizer shaft 201 (Fig. 2) so that the usual resetting pawls will pick up the differently positioned wheels and rotate them until they all stand at zero. The mechanism for controlling the resetting of the sub-totalizer is under control of the sub-total manipulative device 450.

As above explained, after a sub-total is printed by pulling the lever 450 forward, the lug 505 (Fig. 5), arm 508 and arm 563 cause the segment 560 to rotate clockwise as the lever 450 is returned home. This movement of segment 560 is used to rotate the totalizer wheels of the sub-totalizer to their zero positions through the medium of the shaft 201 which is connected to the segment 560 during the forward movement of the lever 450. This entire resetting mechanism is fully shown and described in the parent application, and since the details thereof are not necessary to an understanding of the invention claimed in this case, no further explanation will be given.

*Printing from the grand totalizer*

At the end of the day's business, or in some cases, at the termination of an arbitrary period, the total of all the items entered in the machine is usually obtained, which operation is well known in the art as the "taking of a grand total". After this has been obtained the totalizer is usually cleared preparatory to accumulating the items of the business transacted during a subsequent period.

To take a grand total all that is necessary is to swing the printer frame to its lowest position until the platen is directly over the grand totalizer and when the platen is in this position it will be automatically actuated and the total standing upon the wheels will be printed upon an inserted slip. This procedure is quite similar to that in taking a sub-total with the exception that the printer frame is rocked downwardly a greater extent when taking a grand total.

Reference to Fig. 3 will show that since the width of the totalizer wheels of the grand totalizer is greater than the combined width of the itemized receipt paper and the record strip it will be impossible to print a grand total upon either of these or both, so it is necessary to insert a separate piece of paper between the ribbon and the type carriers.

The printer frame is provided with suitable guide plates for the paper and inking ribbon as is explained and shown in detail in the patent to Raymond E. Rice #1,554,671, dated September 22, 1925. The itemized receipt and record strip paper are withdrawn from the printer frame and a piece of paper, inserted between the guide plates and the impression block 690, is substituted therefor. Printing of the grand total will now take place upon the inserted slip.

To rock the printer downwardly there is provided a grand total manipulative device 278G (Fig. 3) which is integral with the right printer side frame 268.

By grasping this device 278G and rocking the printer frame forward thereby, a total is printed from the grand totalizer in the manner fully shown and described in the parent application.

*Machine and key locking mechanism*

As previously described, independent devices are provided for entering items and for recording the sub-total, and, as it is desirable to prevent simultaneous operation of these two devices, to avoid disarranging some of the mechanism and confusing the printed record, the following interlocking devices are provided.

Fast to the rotation shaft 51 is a disc 527 (Fig. 4) provided with a locking slot 529. Pivoted to the sub-total manipulative device 450 by means of a screw 526 is a rearwardly extending locking arm 525 bifurcated to engage the rotation shaft 51 and provided with a lug 528 adapted to contact with the periphery of the disc 527 or register with the locking slot 529 at the appropriate time.

From the above it will be seen that whenever the lever 450 is operated the lug 528 will enter the locking slot 529 and thereby lock the item recording means against operation, and conversely when the shaft 51 is rotated by operation of the item recording means the lug 528 will bear against the periphery of the disc 527 and thereby prevent movement of the sub-total manipulative device 450.

While the form of mechanism herein shown and described is admirably adapted to fulfill the objects primarily stated, it is to be understood that it is not intended to confine the invention to the one form of embodiment herein shown and described, as it is susceptible of embodiment in various forms, all coming within the scope of the claims which follow:

What is claimed is:

1. In a cash register, the combination of a plurality of totalizer actuating means, a group of printing totalizers cooperating therewith, a pivoted printing frame, means whereby the frame may be moved to print from one of the totalizers, additional means for moving the frame to print from the other totalizer, an alarm, a normally locked cash drawer, and means for sounding said alarm, releasing the cash drawer, resetting the second totalizer, and locking said actuating means concomitantly with the actuation of said additional means.

2. In a cash register, the combination with item printing wheels, manipulative devices for setting the item printing wheels, a printing totalizer for accumulating a series of items, a printer frame, carrying a record strip and normally in a position over the item printing wheels and movable to a position over said printing totalizer, impression making devices for printing the items and totals upon the strip, drawer release mechanism, and means for moving the printer frame over the printing totalizer to actuate the impression making devices to take an impression upon the record strip and for operating the drawer release mechanism.

3. In a cash register having item printing mechanism, the combination of devices for printing a total of items upon an issued check, a reciprocable lever for actuating the said devices, a rock shaft, a drawer release mechanism operated by a movement of said rock shaft, and normally ineffective connections from said lever to the shaft for actuating the drawer release when a total is printed upon a check.

4. In a machine of the class described, item entering and accumulating mechanism, printing mechanism, a reciprocable lever adapted to print the total of the items, drawer latching mechanism, and connections between the drawer latching mechanism and the reciprocable lever including a normally disconnected operating link, means causing the link to be connected when the lever is moved in one direction and to actuate the drawer latch when the lever is moved in the opposite direction.

5. In a machine of the class described, a reciprocable total printing lever, drawer latching mechanism, and connections between the lever and the latching mechanism including a link having a cam edge, a stationary stud cooperating with the link to guide the same, and a lever normally disconnected from the link and adapted to be connected with the link upon movement of the printing lever on its return stroke.

6. In a machine of the class described, means to enter items therein, printing mechanism, a reciprocable lever adapted to print the total of the entered items, a drawer latching mechanism, and connections between the lever and the latching mechanism, including a normally disconnected link, means to enable connection of the link upon initial movement of the lever, means to cause a movement of the drawer latch upon the return stroke of the lever, and means to cause the link to become disconnected at the end of the return stroke.

7. In a machine of the class described having means to accumulate items and print the total thereof, a reciprocable lever to actuate the printing mechanism, a drawer latch, and connections between the lever and the latch including a spring-pressed link, a cam edge on the link, a lever adapted to connect the link and the drawer latch, and means including the cam edge and the spring to cause the link to become engaged and disengaged with the last mentioned lever upon reciprocation of the first mentioned lever.

FREDERICK L. FULLER.